US009779097B2

(12) United States Patent
Arriola et al.

(10) Patent No.: US 9,779,097 B2
(45) Date of Patent: Oct. 3, 2017

(54) PLATFORM AGNOSTIC UI/UX AND HUMAN INTERACTION PARADIGM

(75) Inventors: George Arriola, San Francisco, CA (US); Carsten Schwesig, San Francisco, CA (US); Michael Bauerly, San Francisco, CA (US)

(73) Assignees: SONY CORPORATION, Tokyo (JP); SONY NETWORK ENTERTAINMENT INTERNATIONAL LLC, Los Angeles ( * ) Notice: Subject to any disclaimer, the term of this patent is extended or adjusted under 35 U.S.C. 154(b) by 639 days.

(21) Appl. No.: 13/442,525

(22) Filed: Apr. 9, 2012

(65) Prior Publication Data

US 2012/0278764 A1 Nov. 1, 2012

Related U.S. Application Data

(60) Provisional application No. 61/518,152, filed on Apr. 28, 2011.

(51) Int. Cl.
*G06F 3/048* (2013.01)
*G06F 17/30* (2006.01)

(52) U.S. Cl.
CPC .............................. *G06F 17/30058* (2013.01)

(58) Field of Classification Search
None
See application file for complete search history.

(56) References Cited

U.S. PATENT DOCUMENTS

| 6,690,391 | B1 * | 2/2004 | Proehl et al. ................. 715/720 |
| 2005/0039110 | A1 | 2/2005 | De La Vega |
| 2005/0091597 | A1 * | 4/2005 | Ackley ................ G11B 19/025 |
| | | | 715/716 |

(Continued)

FOREIGN PATENT DOCUMENTS

| EP | 2463862 A1 | 6/2012 |
| WO | WO2009099695 | 8/2009 |

OTHER PUBLICATIONS

Media Portal Wiki, Gallery, Oct. 18, 2011, http://wiki.team-mediaportal.com/1_MEDIAPORTAL_1/17_Extensions/4_Skins/aMPed/0_Gallery.*

(Continued)

*Primary Examiner* — William Trapanese
(74) *Attorney, Agent, or Firm* — Trellis IP Law Group, PC (57) ABSTRACT

In one embodiment, a method of controlling a user interface can include: displaying first objects in a foreground on a display screen, where each first object represents media content, and where the first objects are displayed with a first display characteristic; accepting a signal indicating user selection of one of the first objects; displaying media content for the selected object in a background on the display screen, where the media content is displayed in the background with a second display characteristic, where the second display characteristic includes a changed cinematic characteristic from the first display characteristic in order to reduce attraction of attention for the second display characteristic relative to the first display characteristic; and displaying second objects in the foreground on the display screen, where the second objects are associated with the selected object, and where the second objects are displayed with the first display characteristic.

23 Claims, 7 Drawing Sheets

(56) References Cited

U.S. PATENT DOCUMENTS

| | | | |
|---|---|---|---|
| 2005/0257169 A1* | 11/2005 | Tu | 715/810 |
| 2006/0148528 A1* | 7/2006 | Jung et al. | 455/566 |
| 2007/0028268 A1* | 2/2007 | Ostojic et al. | 725/52 |
| 2009/0177966 A1 | 7/2009 | Chaudhri | |
| 2009/0318310 A1 | 12/2009 | Liu | |
| 2010/0153017 A1 | 6/2010 | De La Vega | |
| 2010/0313166 A1 | 12/2010 | Nakayama | |

OTHER PUBLICATIONS

Ryan Paul: "Hands-on: Reading e-books on Android with Aldiko", 23 Oct. 2010 (Oct. 23, 2010), XP002717499, Retrieved from the Internet: URL: http://arstechnica.com/information-technology/20 1 O/O9/handson-reading-e-books-on-android-with-aldkio / [retrieved on Dec. 5, 2013].

* cited by examiner

PLATFORM AGNOSTIC UI/UX AND HUMAN INTERACTION PARADIGM

CROSS REFERENCES TO RELATED APPLICATIONS

This application claims priority from U.S. Provisional Patent Application Ser. No. 61/518,152, entitled GENOME PLATFORM AGNOSTIC UI/UX AND HUMAN INTERACTION PARADIGM, filed on Apr. 28, 2011, which is hereby incorporated by reference as if set forth in full in this application for all purposes.

BACKGROUND

In order for a user to interact with a computing/display device to access media content, a user interface (UI) may be used. The user may navigate the UI in order to locate and play, or otherwise access, requested media content, such as a movie. Menu structures can include hierarchical structures whereby one set of menu items is found after selecting an appropriate menu item in the hierarchy.

Typically, different devices or device types have unique UIs. Thus, a user may need to learn to navigate different UIs for different devices that the user might use. Also, a given UI typically employs standard icons and/or pop-up based hierarchical menu presentations. In addition, many UIs are restrictive in terms of accessible menu items when media content is being played.

SUMMARY

Particular embodiments provide a user interface (UI)/user experience (UX) that is adaptable to a range of hardware and software platforms. Particular embodiments also utilize cinematic characteristics to direct attention to one or more menu items, even while media content is being displayed.

In one embodiment, a method of controlling a user interface can include: (i) displaying a plurality of first objects in a foreground on a display screen, where each of the plurality of first objects represents media content, where the plurality of first objects are displayed with a first display characteristic; (ii) accepting, by a computing device, a signal indicating user selection of an object from the plurality of first objects; (iii) displaying media content for the selected object in a background on the display screen, where the media content is displayed in the background with a second display characteristic, where the second display characteristic comprises a changed cinematic characteristic from the first display characteristic in order to reduce attraction of attention for the second display characteristic relative to the first display characteristic; and (iv) displaying a plurality of second objects in the foreground on the display screen, where the plurality of second objects are associated with the selected object, where the plurality of second objects are displayed with the first display characteristic.

A further understanding of the nature and the advantages of particular embodiments disclosed herein may be realized by reference of the remaining portions of the specification and the attached drawings.

DETAILED DESCRIPTION OF EMBODIMENTS

Particular embodiments provide a user interface (UI)/user experience (UX) that is adaptable to a range of hardware and software platforms. For example, the UI can be the same across a wide variety of products and/or platforms (e.g., television, smartphone, game system, laptop, tablet, etc.), and thus may be platform agnostic, save for sizing issues for the different display screen dimensions.

Particular embodiments are directed to a user interface design whereby foreground and background content may be presented to a user in different shades, tones, and/or with different cinematic characteristics. In this way, menus, media content, and/or other objects, can be navigated by having the foreground content more easily visible and searchable by the user, as compared to the background content. Also, various cinematic characteristics as to foreground/background content can be used to direct the attention of the user, even while media content is being displayed.

Particular embodiments can support a wide variety of media types (e.g., music, photos, videos, books, games, etc.) that are commonly accessed on consumer electronic devices. Also, a UI in particular embodiments can support any suitable user input device control, such as pointer-based interaction (e.g., mouse) or highlight-driven interaction (e.g., remote control, gesture input, etc.).

Particular embodiments are also suitable for network-enabled devices, and may support devices that are connected to the Internet, or to a secure network, via any type of connection. For example, network connections may be based on a cellular network, a wired network, or a wireless network. As such, content sources can include any content sources that are available via the Internet. Particular embodiments may utilize such network connectivity to access content, and to provide a socially connected user experience. Cloud computing, whereby aspects are implemented as one or more services that are connected cloud elements, can also be supported in particular embodiments.

A user may set up connections to services that are relevant to them. Social network accounts can be linked in order to source socially relevant content for the user. Also, network storage accounts can be linked for synchronization with local storage content. Other topics (e.g., Twitter hashtags) that are of interest to the user can also be added and linked. Particular embodiments may utilize the various links, or other sources, in order to provide previews of commercial content, media related to trending topics, media related to user-specified hashtags, recently captured or consumed media from a local library of the device, and/or other media content.

Particular embodiments may apply cinematic techniques to create a unique user experience for a consumer electronics space. The cloud may also be used to provide music unlimited, video unlimited, store services (e.g., electronic reader), and personal space. Particular embodiments may support common platforms and a core design grammar that is suitable for implementations on a wide variety of operating systems (e.g., Windows 8, Android, etc.), and may allow adaptation of new products and services based on the common UI platform.

Particular embodiments can also provide a user experience that is unique to each user of the UI. The user experience can be defined by how each person uses the application, and in particular can include preferences and social network content for the user. An example UI can combine typographic UI elements along with an emphasis on content. As a result, the content itself may dominate (e.g., in a display background) the UI, even during menu navigation and other tasks that include a relatively large number of UI elements.

Specific content (e.g., currently playing music, video, etc.) can be emphasized (e.g., in terms of screen space) with navigation menu items that overlay the media content. Further, content that is popular within a social circle, such as may be determinable via social networks, can be emphasized in the UI. FIGS. 1-6 show various layers of an example UI in particular embodiments, and FIG. 7 shows an example overlay arrangement of the various layers.

Figure 1:
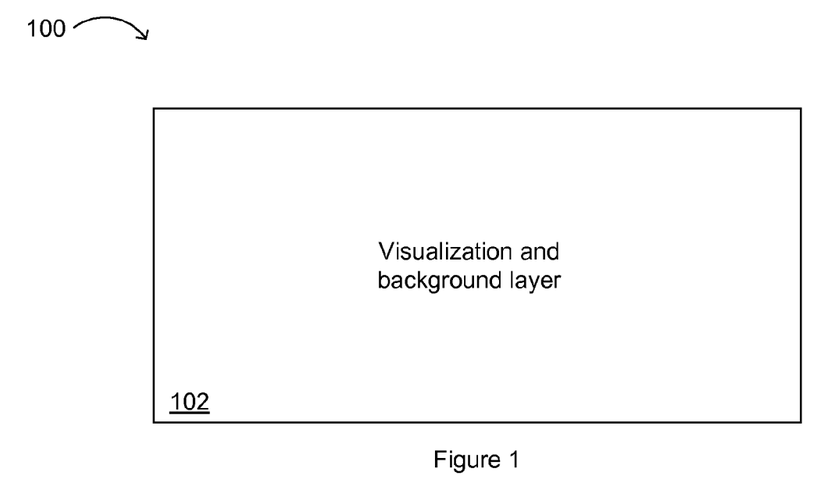
FIG. 1 depicts an example visualization and background layer of a user interface (UI).

FIG. 1 depicts an example visualization and background layer 100 of a UI. The visualization and background layer may be presented on display screen 102, and may be used to color and to affect the mood or feeling of the UI. For example, background colors can be determined by user activity, such as selection of a specific type of media content, or predominant usage of a particular type of media content. Colors for the background may generally be used to keep the user's attention. For example, video and television media content types can correspond to a red background, games can correspond to a blue background, text/reader can correspond to a green background, and an application list can correspond to a yellow background.

Thus in particular embodiments, the background color for display via the visualization and background layer, may be associated with a particular type of content being consumed. Source variables ranging from usage statistics to cover art may be abstracted and reconstructed in order to visualize elements that are unique to each device. For example, a different background color can be presented for cases where the user predominantly reads books, listens to music, uses photos, or experiences all media types.

Figure 2:
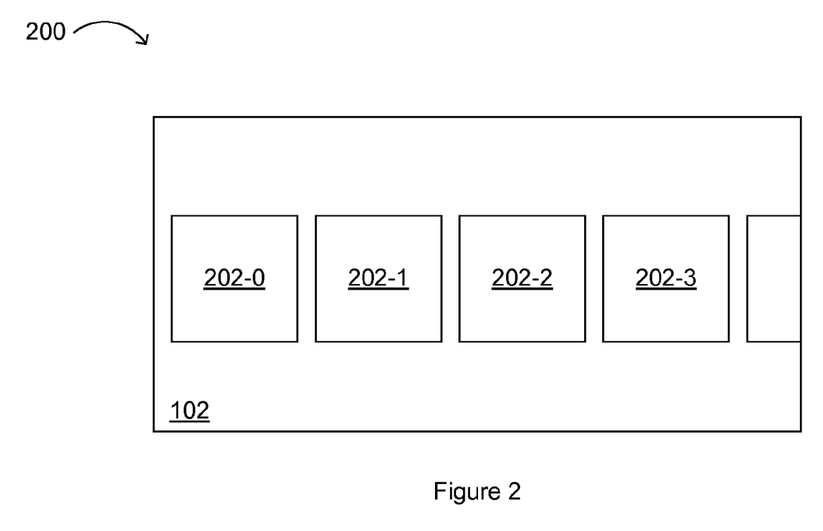
FIG. 2 depicts an example content layer of the UI.

FIG. 2 depicts an example content layer 200 of the UI. Content layer 200 can be displayed on display screen 102 (e.g., on visualization/background layer 100). Content layer 200 can include objects 202 (e.g., 202-0, 202-1, 202-2, 202-3, etc.) that each may represent media content (e.g., music, videos, etc.). For example, a user may select (e.g., by mouse click, hover, by gesture input, by finger swipes, etc.) object 202-1, and corresponding media content may then be played. Objects 202 may also be chosen according to dynamic aggregation of relevant content by collecting items that are popular in the user's social circle, along with personalized commercial recommendations, and content recently interacted with by the user.

Figure 3:
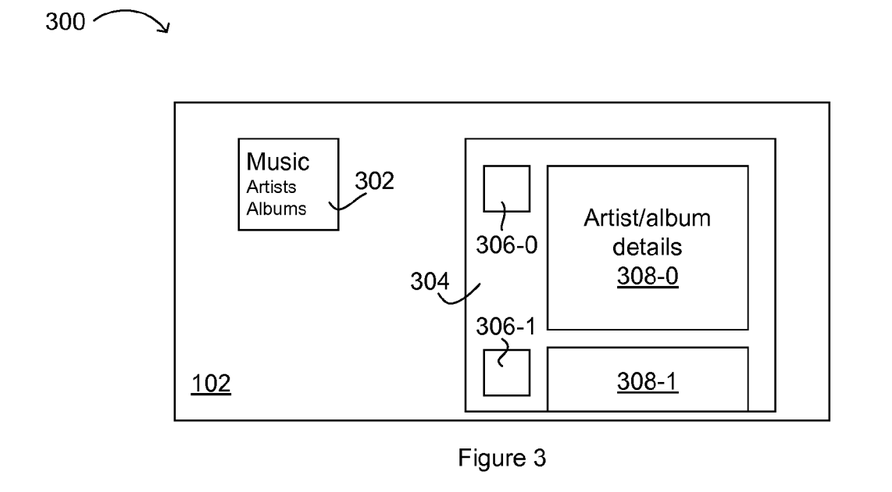
FIG. 3 depicts an example music options layer of the UI.

FIG. 3 depicts an example music options layer 300 of the UI. This example music options layer can include an identifier 302 to indicate that it is a music menu, and also that the particular view includes artist and album indexing. Particular embodiments also support other views for navigation of music content. In this example, a list 304 can include album art 306 (e.g., 306-0, 306-1, etc.) along with corresponding details 308 (e.g., 308-0, 308-1, etc.). A user might click on artists in box 302, and an artist-indexed view can be populated in list 304. Similarly, a user might click on albums in box 302, and an album-indexed view for a particular artist can be populated in list 304.

Other views for music content can also be supported in particular embodiments. For example, a bucket view including now playing, along with a mix of recommended playlists, artists, albums, and channels can be supported. Also, a player view with display of the album artwork for the current track, along with transport controls and metadata for the current track and play queue. A play queue view can also be supported, and may include a current play queue list displayed in order as an overlay on top of the player view.

Figure 4:
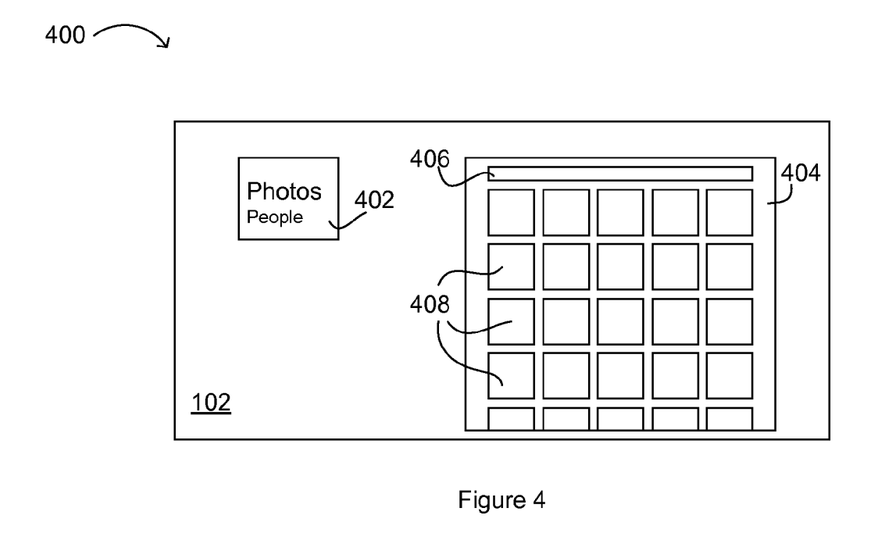
FIG. 4 depicts an example photos options layer of the UI.

FIG. 4 depicts an example photos options layer 400 of the UI. In this particular example, an alternative thumbnail-based view of the photos is shown. Identifier 402 can indicate that thumbnail photos of people are being shown in box 404. Indicator bar 406 may indicate the particular photo album or other identifier of the photos, and thumbnails 408 can indicate particular photograph media content that may be accessed. Of course, other view for photographs and other types of media content can also be accommodated in particular embodiments.

Figure 5:
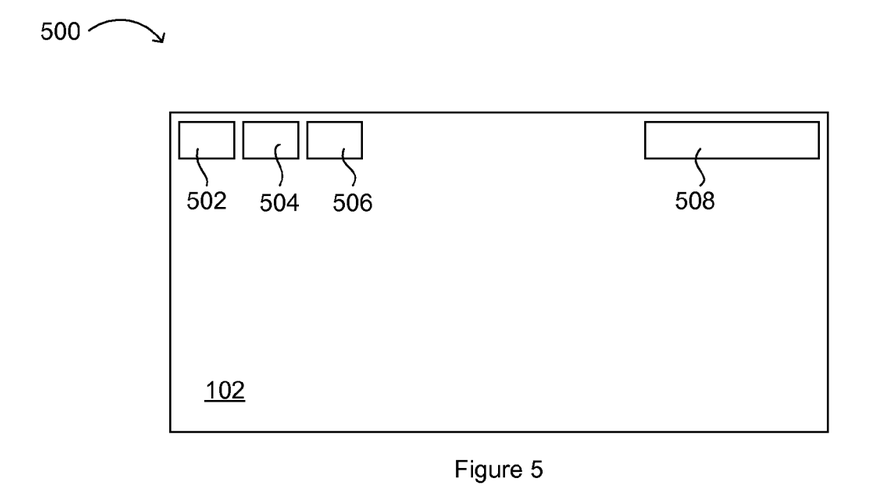
FIG. 5 depicts an example persistent controls layer of the UI.

Content layer 200, as well as the options layers (e.g., 400, 500) can represent a multi-aggregated rich media content view. Also, user interaction for selection or navigation between various options layers, as well as return to a global navigation layer, can include finger swipe interaction for a touch-sensitive display screen 102. For example, a two-finger swipe anywhere on the display screen may return the user to a previous screen or option layer, to a global navigation layer, or to an option layer that is determined based on user preferences or predominant interactions.

FIG. 5 depicts an example persistent controls layer 500 of the UI. The persistent controls layer can include links to the global navigation, and to search transport controls (e.g., if music is currently playing). For example, search transport controls 502, 504, and 506 can be used to control a portion of the song or album that is being played (e.g., stop, pause, search, jump, etc.). A link to global navigation, such as to a top global navigation layer, can also be provided at 508. As another example, links to different navigation points in the menu hierarchy. For example, one link may go to a global navigation layer, another link may go to a top menu associated with a current media type (e.g., music), and another link may go to a top menu associated with another media type (e.g., a favorite or predominant media type). In addition, finger swipes (e.g., two-finger swipes) can also be used to navigate or to return to certain menu positions.

Figure 6:
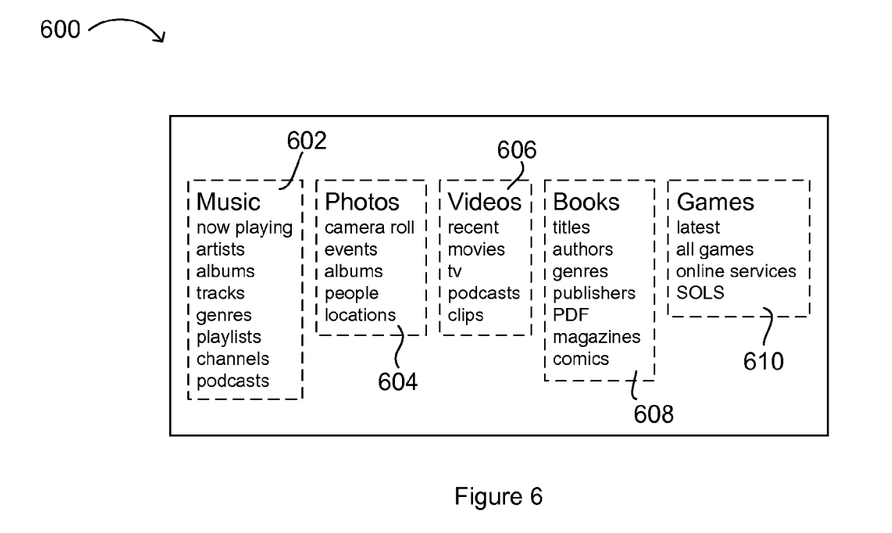
FIG. 6 depicts an example global navigation layer of the UI.
Figure 7:
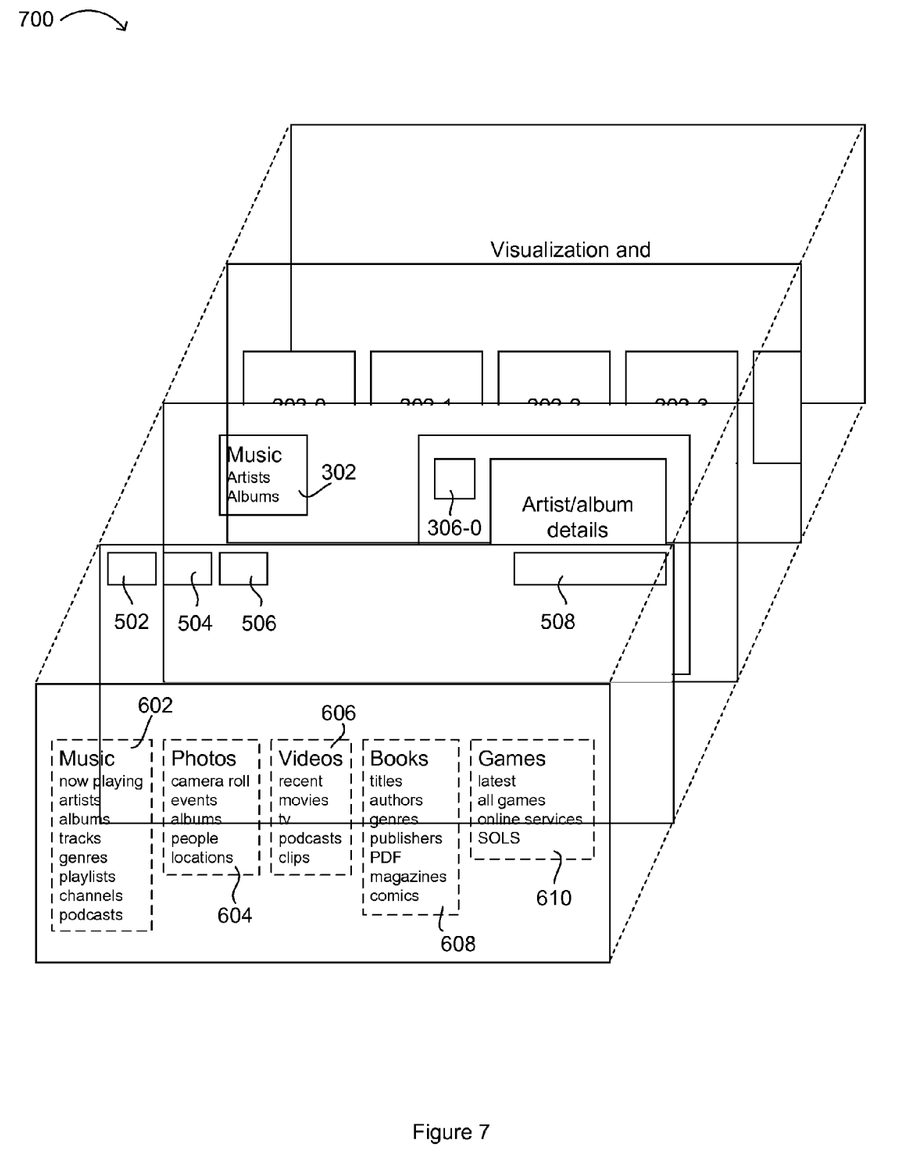
FIG. 7 depicts an example overlay of various layers of the UI.

FIG. 6 depicts an example global navigation layer 600 of the UI. For example, the global navigation layer can include a set of links to each section and subsection of the UI application. In particular embodiments, global navigation layer 600 may include textual information that overlays a background and/or other media content that is being played. This textual information may represent objects that are associated with menu items and/or direct media content.

In this example, textual information 602 may represent a music global menu, and can include a music identifier, with now playing, artists, albums, tracks, genres, playlists, channels, and podcasts, items for selection therein. Textual information 604 may represent a photos global menu, and can include a photos identifier, with camera roll, events, albums, people, and locations items for selection therein. Textual information 606 may represent a videos global menu, and can include a videos identifier, with recent, movies, television, podcasts, and clips items for selection therein. Textual information 608 may represent a books global menu, and can include titles, authors, genres, publishers, PDF, magazines, and comics items for selection therein. Textual information 610 may represent a games global menu, and can include latest, all games, online services, and SOLS items for selection therein.

Global navigation layer 600 can be accessible at any point by using a predetermined button or user interaction, such as a two-finger swipe motion on the display screen. Global navigation layer 600 can overlay any other content when accessed. Such a global menu can allow users to navigate the top two levels of menu hierarchy. If a user selects the media type label (e.g., music), a "strand" view (see, e.g., FIG. 8) for that media type can be displayed unless content is currently playing that media type.

FIG. 7 depicts an example overlay 700 of various layers of the UI. In this example, global navigation layer 600 may overlay upon persistent controls layer 500. Persistent controls layer 500 can then overlay upon one of photos options layer 400 or music options layer 300, or any of the other options layers (e.g., games, books, videos, etc.). For example, options layer 300 for music options can overlay upon content layer 200, which can be overlay upon background layer 100.

Figure 8:
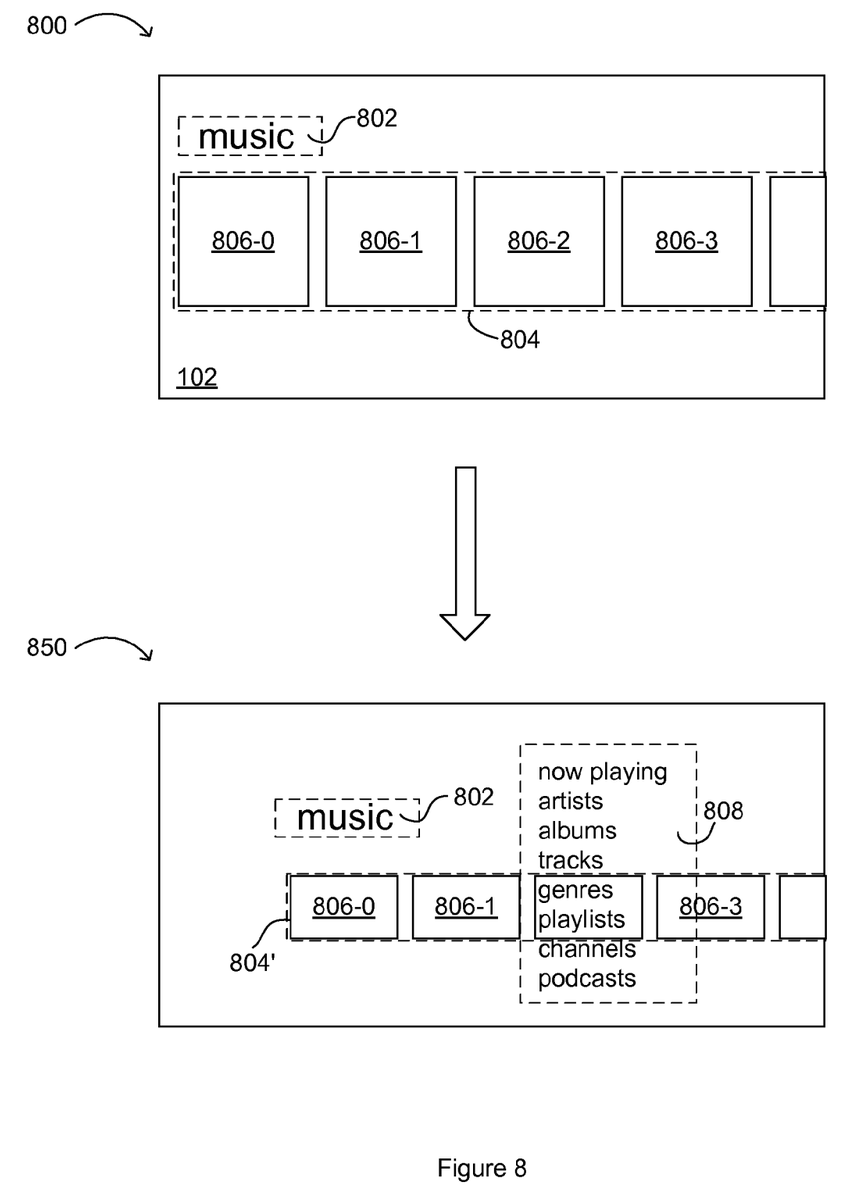
FIG. 8 depicts an example change in display characteristic of the UI in response to user selection.

FIG. 8 depicts an example change in display characteristic of the UI in response to user selection. In the example of 800, music indicator 802 may convey that object set 804 includes music media content (e.g., objects 806-0, 806-1, 806-2, 806-3, etc.). Such music objects 806 may be in the form of album art, icons, or other music media content indicators. Thus, when a user selects one of objects 806, media content that is represented by that selected object can be played, and a corresponding display can be presented on display screen 102.

Once a user has made a selection, the UI may change the display, such as shown in example 850. Music indicator 802 may be repositioned, and object set 804 can be refocused and/or re-sized as shown in modified object set 804'. As another example, media content represented by the media content can be played in the background of display 102. In any event, media content for the selected object can be displayed in the background, and with a changed cinematic characteristic relative to a display characteristic of the display characteristics prior to the user selection. The list of music objects (e.g., a menu list) for selection 808 can be presented with a display characteristic designed to attract attention (e.g., a clarity), and can include now playing, artists, albums, tracks, genres, playlists, channels, and podcasts). Thus, depending on whether the user selection is for particular media content, or for an additional menu, the UI in particular embodiments may adjust display characteristics, such as by changing one or more cinematic characteristics, in order to direct user attention to particular objects (e.g., a new text-based menu, different content, etc.).

Particular embodiments can support unique cinematic transitions, and three-dimensional depth of field techniques in order to increase or reduce attraction of a user's attention. By using such a depth of field technique, the UI can be used to show the user where to visually focus, such as by showing the user where to look or touch on the display screen. For example, a bookshelf as in a movie can be used to provide an indication to the user that a selection (e.g., for an electronic reader) can be made from that set of books. In this way, a list of objects can represent a menu of items or media content that can be selected for access.

Cinematic characteristics or techniques can include defocusing to convey to the user to focus on a layer that may be otherwise substantially clear. For example, an in-focus portion may represent UI elements or objects that are active, or a layer of UI elements that is active, while an out-of-focus portion can represent deactivated objects or elements. For example, an out-of-focus portion can represent media content that is being played (e.g., in a display background), but whereby the playback may not be available for modification until a return to appropriate menu objects, such as by another user selection.

Other cinematic techniques that can be used in particular embodiments include making one or more layers transparent, as well as various types of fading or blurring. For example, a Gaussian blur can be employed whereby a blurring or smoothing of displayed features is done according to a Gaussian function. The Gaussian blur can be used to reduce image noise and to reduce detail, thus producing less clarity in the image. Of course, other types of blurring or fading, as well as other cinematic techniques, can also be used in particular embodiments. In this way, cinematic techniques (blurring, shading, etc.) can be used to indicate to the user a mode of how to interact with the UI.

A user can control interaction by mouse, hover state, highlight-driven selection, remote with capacitive touch, etc., and can change what is clear and/or activated in the UI. The user can effectively access a UI menu structure that is essentially off camera or out of the display view, but when the user interacts with the UI, the menu items that were off camera can come into place for user access. For example, a user can click on something (e.g., an object), and in response that selected object (and possibly the associated media content) can be blurred out and moved to the background of the display. However, what the user has selected (e.g., media content, textual information for a menu list, etc.) may come into focus. In addition, smooth transitions of display items moving from foreground to background, and in and out of focus, as a result of user interaction, can be provided as part of changing cinematic characteristics in particular embodiments.

Thus in particular embodiments, objects may be placed into a background of the display when selected, and new objects may be brought into the display based on the user selection. Further, differentiation between the foreground and background objects can be made by using cinematic effects, such as shading, flattening, blurring, etc., and three-dimensional cinematic depth of field (e.g., semi-opaque layers, Gaussian blur, radial blur, etc.). In this way, a user can navigate through a menu hierarchy by clicking or otherwise selecting something, which then becomes the blurred background content. The new menu items resulting from the user selection can be presented in the foreground with clarity to direct the attention of the user. Particular embodiments can support a variety of cinematic characteristic changes and effects in order to differentiate foreground/background and other display content portions.

In this way, motion graphics utilizing various cinematic techniques and/or characteristics may be used to focus the attention of the user. Some transitions may be achieved by a camera moving in a three-dimensional space, instead of a fixed camera and stage on which UI element movement occurs. A defocusing effect or depth of field effect can be used to complement the camera movement in order to enhance the attention directing aspects of the UI.

Other types of user interactions can result in other types of graphics for the UI. For example, tapping on an object 806 can navigate to the content represented by that object. A next step may be a collection, a detail view for a content item, or a full screen playback view. Horizontal dragging on an array of objects 806 can scroll the objects or tile array with a direct mapping between drag speed and scroll speed. Also, a long press can access context-specific options for that item.

In one embodiment, a method of controlling a user interface can include: (i) displaying a plurality of first objects in a foreground on a display screen, where each of the plurality of first objects represents media content, where the plurality of first objects are displayed with a first display characteristic; (ii) accepting, by a computing device, a signal indicating user selection of an object from the plurality of first objects; (iii) displaying media content for the selected object in a background on the display screen, where the media content is displayed in the background with a second display characteristic, where the second display characteristic comprises a changed cinematic characteristic from the first display characteristic in order to reduce attraction of attention for the second display characteristic relative to the first display characteristic; and (iv) displaying a plurality of second objects in the foreground on the display screen, where the plurality of second objects are associated with the selected object, where the plurality of second objects are displayed with the first display characteristic.

Figure 9:
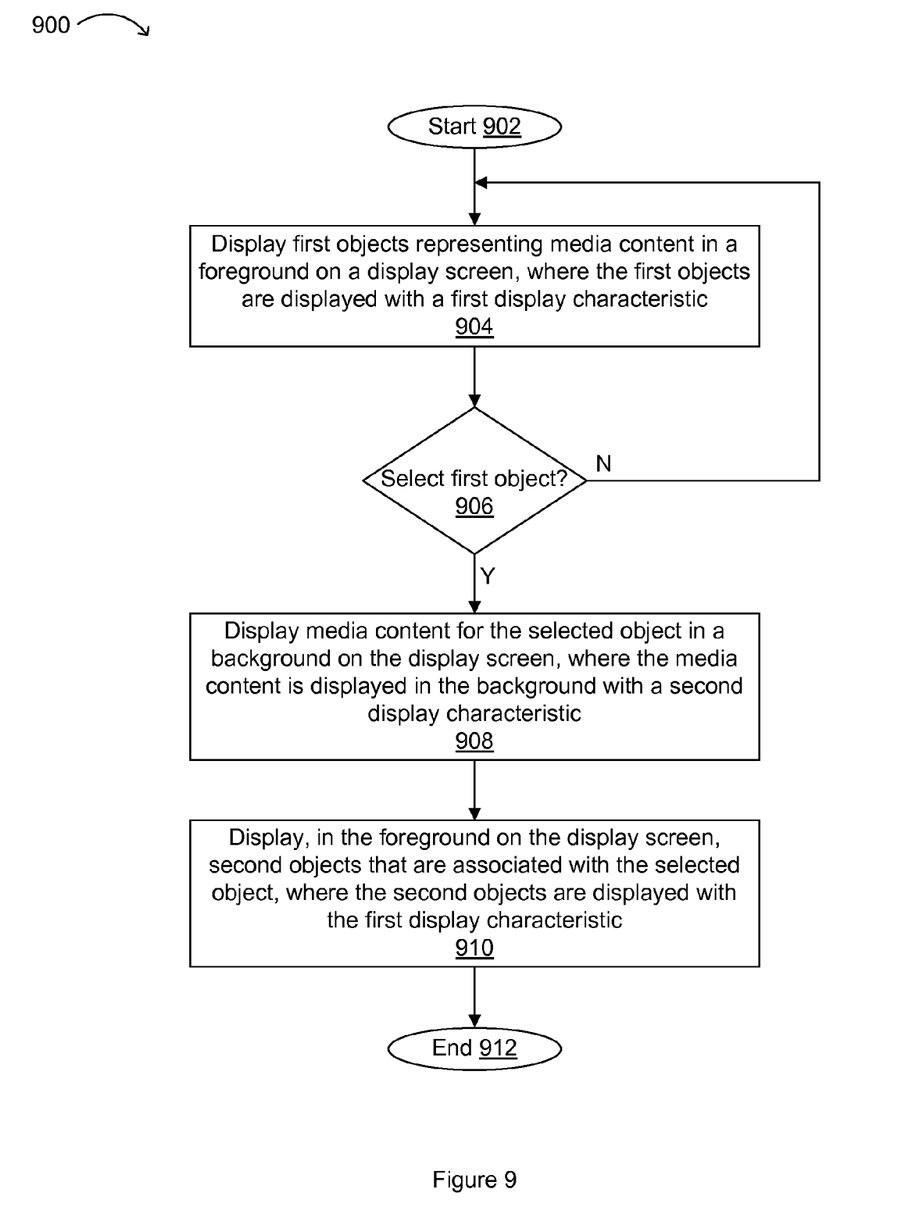
FIG. 9 is a flow diagram of an example method of controlling a UI.

FIG. 9 is a flow diagram 900 of an example method of controlling a UI. The flow can begin at 902, and at 904, first objects representing media content can be displayed in a foreground on a display screen. The first objects can be displayed with a first display characteristic. For example, the first display characteristic can include a certain clarity, orientation, size, color, etc., so as to distinguish the first objects in the foreground of the display, and to accordingly direct a user's attention thereto.

At 906, it can be determined whether a user has selected one of the first objects. For example, the user may be selecting one of the first objects in order to play or otherwise access the media content represented by that selected first object. As discussed above, particular embodiments support such selection by a variety of techniques (e.g., mouse click, remote control track pad, gesture input, etc.). If the user has made a selection, at 908 the media content for the selected object can be played in a background on the display screen. The media content can be displayed on the background with a second display characteristic. For example, the second display characteristic may have a changed cinematic characteristic from the first display characteristic so as to reduce a user's attention to the media content currently playing in the background on the display screen.

At 910, second objects that are associated with the selected object can be displayed in the foreground on the display screen, and the flow can complete at 912. The second objects may be displayed with the first display characteristic. For example, the first display characteristic may include a clarity to provide a point of focus for the visual attention of the user. Further, the first and second display characteristics may differ by a changed cinematic characteristic (e.g., fading, shading, three versus two dimensional views, sizing, coloring, etc.) in order to effectively direct a user's attention to certain objects or content, such as objects that differ from the media content currently being played on the display screen.

Figure 10:
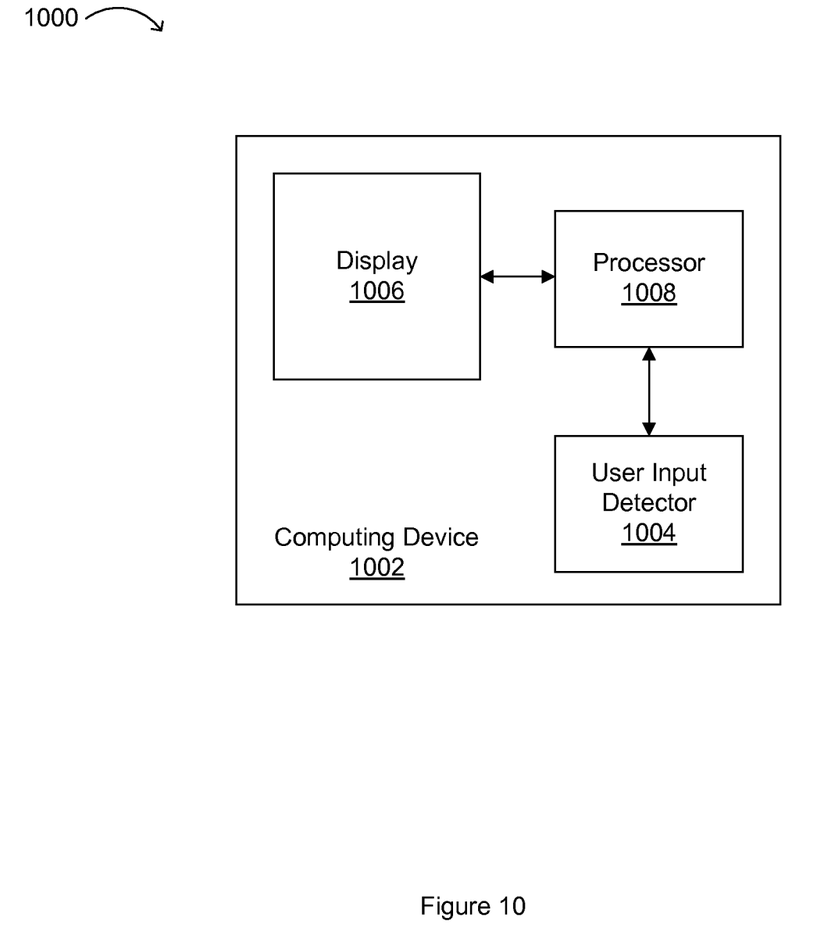
FIG. 10 depicts an example system for the UI.

FIG. 10 depicts an example system 1000 for the UI. In this example, computing device 1002 can include user input detector 1004, display 1006, and processor 1008. Computing device 1002 may represent any suitable device, such as a computer, a laptop, a smartphone, a tablet computer, a television, or any device that can access and play media content. For example, user input detector 1004 can include a mouse interface, a remote control interface, voice input detection interface, touch detection (e.g., capacitive touch detection) interface, and gesture input interface (e.g., a camera, facial recognition engine, etc.). Processor 1008 can include any general purpose processor, such as a central processing unit (CPU), a microcontroller, a graphics processor, or the like. Display 1006 can be any suitable type of display screen, such as a television display and/or a touch sensitive display.

Although the description has been described with respect to particular embodiments thereof, these particular embodiments are merely illustrative, and not restrictive. For example, hierarchical menus, while shown herein as predominantly plain text, could also be thumbnails or groupings.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

A "processor" includes any suitable hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems. A computer may be any processor in communication with a memory. The memory may be any suitable processor-readable storage medium, such as random-access memory (RAM), read-only memory (ROM), magnetic or optical disk, or other tangible media suitable for storing instructions for execution by the processor.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

What is claimed is:

1. A method of controlling a user interface, the method comprising:
   displaying a plurality of first objects in a foreground on a display screen, wherein each of the plurality of first objects represents media content, wherein the plurality of first objects are displayed with a first display characteristic;
   accepting, by a computing device, a signal indicating user selection of an object from the plurality of first objects;
   displaying, in response to the signal indicating user selection, media content for the selected object in a background on the display screen while the plurality of first objects remains displayed in the foreground, wherein the media content is displayed in the background with a second display characteristic comprising a changed cinematic characteristic from the first display characteristic; and
   displaying a plurality of second objects in the foreground on the display screen, wherein the plurality of second objects are associated with the selected object, wherein the plurality of second objects are displayed with the first display characteristic, and wherein the plurality of second objects and the plurality of first objects overlie the media content while the media content is displayed in the background layer.

2. The method of claim 1, wherein the plurality of first objects and the plurality of second objects form a menu hierarchy, and wherein the plurality of second objects comprises a plurality of menu items related to the media content.

3. The method of claim 1, wherein the changed cinematic characteristic comprises blurring the display of the media content relative to the display of plurality of second objects.

4. The method of claim 1, wherein the changed cinematic characteristic comprises fading the display of the media content relative to the display of the plurality of second objects.

5. The method of claim 1, wherein the changed cinematic characteristic comprises flattening the display of the media content relative to the display of the plurality of second objects.

6. The method of claim 1, wherein the changed cinematic characteristic comprises a changed cinematic depth of field for the display of the media content relative to the display of the plurality of second objects.

7. The method of claim 1, further comprising changing a color of the background based on a type of the media content for the selected object.

8. The method of claim 7, wherein the color comprises:
   red when the media content type comprises video;
   blue when the media content type comprises a game;
   green when the media content type comprises text; and
   yellow when the media content type comprises an application list.

9. The method of claim 1, further comprising:
   accepting, by the computing device, a signal indicating user selection of a default menu; and
   displaying a plurality of third objects for the default menu on the display screen.

10. The method of claim 1, wherein the displaying the plurality of first objects comprises a highlight-driven display.

11. An apparatus, comprising:
    one or more processors; and
    logic encoded in one or more tangible media for execution by the one or more processors, and when executed being operable to perform:
    displaying a plurality of first objects in a foreground on a display screen, wherein each of the plurality of first objects represents media content, wherein the plurality of first objects are displayed with a first display characteristic;
    accepting a signal indicating user selection of an object from the plurality of first objects;
    displaying, in response to the signal indicating user selection, media content for the selected object in a background on the display screen while the plurality of first objects remains displayed in the foreground, wherein the media content is displayed in the background with a second display characteristic comprising a changed cinematic characteristic from the first display characteristic; and
    displaying a plurality of second objects in the foreground on the display screen, wherein the plurality of second objects are associated with the selected object, wherein the plurality of second objects are displayed with the first display characteristic, and wherein the plurality of second objects and the plurality of first objects overlie the media content while the media content is displayed in the background layer.

12. The apparatus of claim 11, wherein the plurality of first objects and the plurality of second objects form a menu hierarchy, and wherein the plurality of second objects comprises a plurality of menu items related to the media content.

13. The apparatus of claim 11, wherein the changed cinematic characteristic comprises blurring the display of the media content relative to the display of plurality of second objects.

14. The apparatus of claim 11, wherein the changed cinematic characteristic comprises fading the display of the media content relative to the display of the plurality of second objects.

15. The apparatus of claim 11, wherein the changed cinematic characteristic comprises flattening the display of the media content relative to the display of the plurality of second objects.

16. The apparatus of claim 11, wherein the changed cinematic characteristic comprises a changed cinematic depth of field for the display of the media content relative to the display of the plurality of second objects.

17. The apparatus of claim 11, wherein the logic when executed is further operable to perform changing a color of the background based on a type of the media content for the selected object.

18. The apparatus of claim 11, wherein the logic when executed is further operable to perform:
   accepting a signal indicating user selection of a default menu; and
   displaying a plurality of third objects for the default menu on the display screen.

19. The apparatus of claim 11, wherein the displaying the plurality of first objects comprises a highlight-driven display.

20. A system for controlling a user interface, the system comprising:
   means for displaying a plurality of first objects in a foreground on a display screen, wherein each of the plurality of first objects represents media content, wherein the plurality of first objects are displayed with a first display characteristic;
   means for accepting, by a computing device, a signal indicating user selection of an object from the plurality of first objects;
   means for displaying, in response to the signal indicating user selection, media content for the selected object in a background on the display screen while the plurality of first objects remains displayed in the foreground, wherein the media content is displayed in the background with a second display characteristic comprising a changed cinematic characteristic from the first display characteristic; and
   means for displaying a plurality of second objects in the foreground on the display screen, wherein the plurality of second objects are associated with the selected object, wherein the plurality of second objects are displayed with the first display characteristic, and wherein the plurality of second objects and the plurality of first objects overlie the media content while the media content is displayed in the background layer.

21. An apparatus for providing a user interface, the apparatus comprising:
   a processor;
   a display screen coupled to the processor;
   one or more instructions included in a tangible storage device and executed by the processor for:
   displaying a background layer on the display screen, wherein the background layer is capable of displaying content;
   displaying a foreground layer on the display screen, including a content layer operative to display a first set of objects representing content available to be displayed in the background layer;
   accepting a signal from a user input device to select a display object; and
   in response to the signal, displaying content associated with the selected display object on the background layer while the first set of objects remains displayed in the foreground, and displaying, with the first display characteristic, a second set of objects associated with the selected display object in the foreground layer, the second set of objects and the first set of objects overlying the content while the content is displayed in the background layer.

22. A method for providing a user interface, the method executed by a computing system, the method comprising:
   displaying a background layer on a display screen, wherein the background layer is capable of displaying content;
   displaying a foreground layer on the display screen, including a content layer operative to display a first set of objects representing content available to be displayed in the background layer;
   accepting a signal from a user input device to select a display object; and
   in response to the signal, displaying content associated with the selected display object on the background layer while the first set of objects remains displayed in the foreground, and displaying, with the first display characteristic, a second set of objects associated with the selected display object in the foreground layer, the second set of objects and the first set of objects overlying the content while the content is displayed in the background layer.

23. A tangible non-transitory storage device including one or more instructions executable by a processor for:
   displaying a background layer on a display screen, wherein the background layer is capable of displaying content;
   displaying a foreground layer on the display screen, including a content layer operative to display a first set of objects representing content available to be displayed in the background layer;
   accepting a signal from a user input device to select a display object; and
   in response to the signal, displaying content associated with the selected display object on the background layer while the first set of objects remains displayed in the foreground, and displaying, with the first display characteristic, a second set of objects associated with the selected display object in the foreground layer, the second set of objects and the first set of objects overlying the content while the content is displayed in the background layer.

* * * * *